UNITED STATES PATENT OFFICE 2,987,570
Patented June 6, 1961

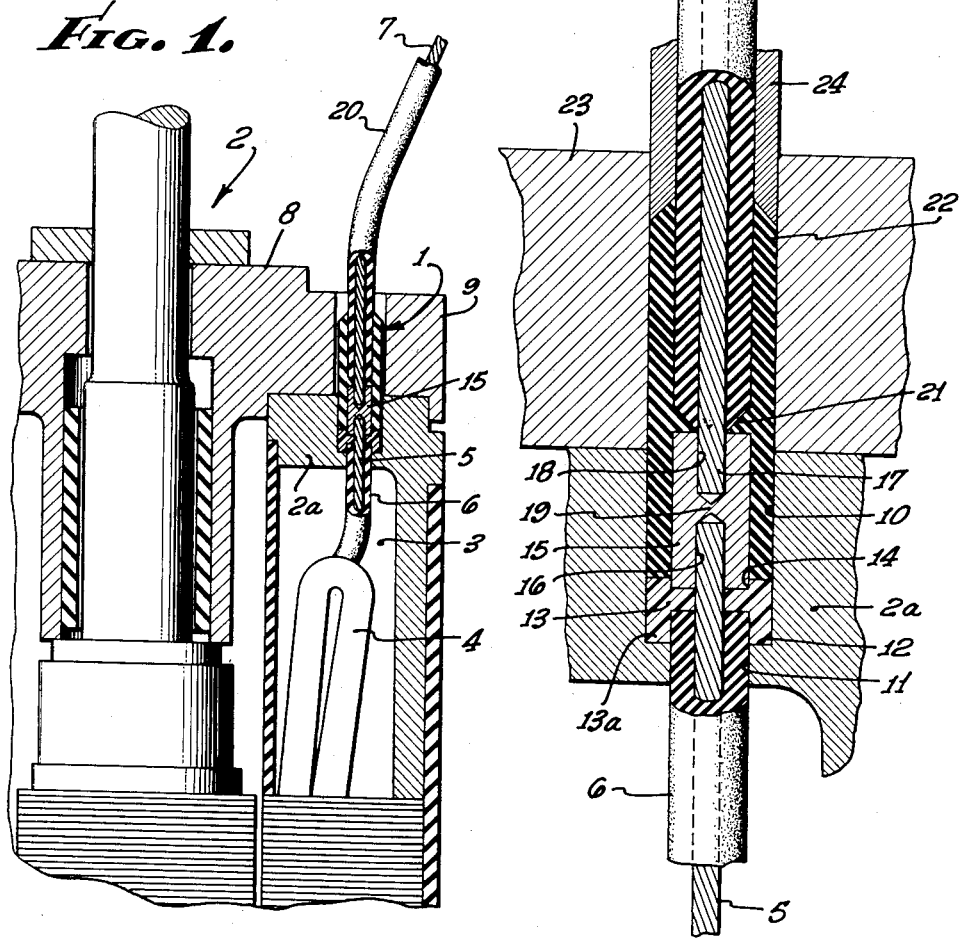

2,987,570
FLUID-TIGHT CONNECTOR STRUCTURE FOR SUBMERSIBLE APPARATUS
Edward J. Bluth, Downey, Calif., assignor to U. S. Electrical Motors, Inc., Los Angeles, Calif., a corporation of California
Filed Feb. 17, 1959, Ser. No. 793,767
2 Claims. (Cl. 174—77)

This invention relates to electrical connectors, and particularly connectors for stranded conductors that are subjected to water or other liquid.

An example of the use of such connectors is in submersible electric motors having a sealed casing. Electrical connection to the stator winding leads from above the well is usually effected by elongated stranded conductors covered with water-proof insulation, such as rubber, and extending downwardly to the motor. The conductors are connected to the winding leads, which are also stranded. There are provisions for sealing the casing around the electrical connection where the connection enters the casing.

In such installations, it is not uncommon to find that water enters into the strands of the conductor and finally reaches the windings. Even when the water thus finding entry to the windings may be quite minute, it is sufficient to cause serious damage to the windings.

It is accordingly one of the objects of this invention to make it possible to stop entry of water from the connection to the leads. In order to accomplish this result, use is made of an intermediate impervious electrical conducting member between the connection and the lead, that thus provides a solid wall interposed between the connections and the lead, through which moisture cannot penetrate.

It is another object therefore to provide an impervious wall that is interposed in the path of any moisture and forms a part of the electrical circuit.

It is still another object of this invention to improve in general lead-in connections for submersible motor windings which are so sealed into the casing as to render the casing fluid-tight.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a fragmentary longitudinal sectional view of apparatus incorporating the invention; and FIG. 2 is a greatly enlarged fragmentary sectional view, illustrating the connector structure embodying the invention; this figure also indicates the position of the molding elements whereby a sealing sleeve or jacket is formed to render the connector structure fluid-tight.

In the present instance, the connector structure 1 is shown as adapted to provide a connection between the exterior of a submersible motor 2 into the interior space 3 wherein the stator winding 4 for the motor is located. The coils of stator winding 4 are connected to stranded cable leads 5, there being a plurality of such leads 5. For example, in a three-phase submersible motor, there would be three such connector structures 1, one for each three-phase lead.

The lead 5 is covered with a rubber insulation layer 6. This lead 5 is arranged to be in electrical conducting relationship with a stranded cable 7 that extends to the top of the well in which the enclosed motor having the casing 2 is submerged.

The casing 2 is provided with a fluid-tight cover 8 forming a wall 9. This wall covers the flange 2a of the motor casing. This flange provides a closed space for winding 4. Cover 9 has a clearance aperture through which the upper end of the connector structure passes.

The flange 2a is provided with a through aperture for the accommodation of the ends of the cable structures adapted to be coupled together. This through aperture includes an upper part 10 of relatively large diameter and a lower part 11 of relatively smaller diameter. A shoulder 12 is defined by these two apertures.

Resting on the shoulder 12 is an insulating heat-resistant gland member, or ring or collar 13 which has a peripheral flange 13a contacting the shoulder 12. This member 13 may be conveniently made of nylon. It has a through aperture for the passage of the exposed end of the stranded conductor 5.

The insulation layer 6 has a diameter that snugly fits into the flange 13a of the ring 13. This flange 13a extends upwardly to form a seat 14 for an impervious metallic conducting member 15. The lead 5 is soldered into the recess 16 formed in the bottom of the member 15, which may conveniently be made of brass. Similarly, the lower end 17 of lead 7 is soldered into a corresponding recess 18 in the upper end of the member 15. Thus the member 15 connects the two cable structures, while at the same time it acts to prevent moisture or water that may get into the stranded conductor 7 from entering the stranded conductor 5. This stop is formed by the impervious wall 19 between the recess 16 and 18.

Insulation layer 20 of rubber overlies the stranded conductor 7, and has a chamfer 21 at its lower end and immediately above the top surface of the member 15.

The diameter of the member 15 is substantially less than the diameter of the upper portion 10 of the aperture in the flange 2a. The annular space between them is filled by a long sleeve or jacket 22 which extends from the top of the flange 13a upwardly and outwardly of the flange 2a surrounding the lower end of the insulation layer 20. The sleeve 22 may conveniently be molded into place and made from neoprene or other synthetic moldable rubber.

Due to the provision of the chamfer 21, this sleeve is restrained against axial movement after it is disposed over the members as shown.

The sleeve 22 is formed by a vulcanizing process so as to adhere to the member 15, as well as to the surface of the aperture 10. In this way, leakage past the outer surface of the sleeve 22 is effectively prevented.

The process of vulcanization can include a mold member 23 extending completely around the insulation layer 20 and resting on top of flange 2a. Into this mold fits an annular piston 24 extending around the cable structure 7—20. Into the aperture 10 and within mold 23 are disposed particles of neoprene or other rubber-like material. The piston 24 is then lowered and pressure maintained while the entire submersible motor is subjected to a vulcanizing temperature as by being placed into a furnace. The surface of aperture 10 and the periphery of member 15 may be coated previously to the vulcanizing process to ensure firm attachment of the sleeve 22 to both these surfaces.

The flange 13a of collar or ring 13 maintains the member 15 in concentric position in the aperture 10 while pressure is exerted upon the vulcanizable material by piston 24. This ensures that the desired thickness of insulation provided by the sleeve 22 between the current-conducting part 15 and the wall 9 will be effectively maintained around the entire periphery of the member 15.

Due to this construction, no water can pass from the stranded conductor 7 to the stranded conductor 5. This ensures against deterioration of the conductors of coils 4.

The inventor claims:

1. In a sealed connector structure: a wall having an aperture therethrough, said aperture having a first portion of enlarged diameter and communicating with a second portion of the aperture of smaller diameter; a collar of insulation material fitting into the first portion, and placed on the shoulder formed between the portions; said collar having a through aperture and an integral flange; an impervious conducting member in the first portion, held in central position by the flange and having a first recess communicating with the collar aperture; a first stranded insulated cable passing through the second portion and having an exposed end in the recess and in conductive relation to the member; a second stranded insulated conductor having an exposed end in conducting relation to the member; the insulation on said second cable being smaller in diameter than the said first portion; and a sleeve of rubber-like material extending around the end portion of said insulation of said second cable, as well as around said conducting member, and within the first portion.

2. In a sealed connector structure: a wall having an aperture therethrough, said aperture having a first portion of enlarged diameter and communicating with a second portion of the aperture of smaller diameter; a collar of insulation material fitting into the first portion, and placed on the shoulder formed between the portions; said collar having a through aperture and a flange; an impervious conducting member in the first portion, held in central position by the flange and having a first recess communicating with the collar aperture; a first stranded insulated cable passing through the second portion and having an exposed end in the recess; a second stranded insulated conductor having an exposed end in conducting relation to the member; the insulation on said second cable being smaller in diameter than the said first portion; and a sleeve of rubber-like material extending around the end portion of said insulation of said second cable, as well as around said conducting member, and within the first portion; said sleeve having a portion exposed beyond the wall, and vulcanized to the said member and to the interior surface of the first portion.

References Cited in the file of this patent

UNITED STATES PATENTS

| 822,293 | Moody | June 5, 1906 |
| 2,091,824 | Lewis | Aug. 31, 1937 |
| 2,310,423 | Gold | Feb. 9, 1943 |
| 2,312,652 | Komives et al. | Mar. 2, 1943 |
| 2,463,231 | Wyatt | Mar. 1, 1949 |
| 2,651,672 | Ivanoff | Sept. 8, 1953 |
| 2,866,109 | Watson | Dec. 23, 1958 |

FOREIGN PATENTS

| 721,665 | Great Britain | Jan. 12, 1955 |